United States Patent
Saikusa et al.

(10) Patent No.: US 7,492,776 B2
(45) Date of Patent: Feb. 17, 2009

(54) NETWORK CONNECTION SYSTEM AND TRAFFIC SHAPING METHOD FOR FACILITATING SHAPING TRAFFIC EVEN IN NETWORK WHICH ACCOMMODATES LINES BASED ON DIFFERENT PROTOCOLS

(75) Inventors: Naoki Saikusa, Tokyo (JP); Toshiyasu Kurasugi, Tokyo (JP)

(73) Assignee: NEC Corporation, Tokyo (JP)

( * ) Notice: Subject to any disclaimer, the term of this patent is extended or adjusted under 35 U.S.C. 154(b) by 980 days.

(21) Appl. No.: 10/803,972

(22) Filed: Mar. 19, 2004

(65) Prior Publication Data
US 2004/0190550 A1  Sep. 30, 2004

(30) Foreign Application Priority Data
Mar. 25, 2003 (JP) ............... 2003-082679

(51) Int. Cl.
H04L 12/56 (2006.01)
H04L 12/66 (2006.01)
H04L 12/26 (2006.01)
H04J 3/22 (2006.01)
H04Q 11/00 (2006.01)

(52) U.S. Cl. .............. 370/401; 370/466; 370/463; 370/359; 370/230.1

(58) Field of Classification Search ............... None
See application file for complete search history.

(56) References Cited

U.S. PATENT DOCUMENTS

| | | | | |
|---|---|---|---|---|
| 5,974,033 A | * | 10/1999 | Kamiya et al. | 370/230.1 |
| 6,529,548 B1 | * | 3/2003 | Aoki et al. | 375/224 |
| 6,888,796 B2 | * | 5/2005 | Iizuka | 370/232 |
| 6,904,054 B1 | * | 6/2005 | Baum et al. | 370/467 |
| 7,088,724 B2 | * | 8/2006 | Yamanaka | 370/395.52 |
| 2003/0108063 A1 | * | 6/2003 | Joseph et al. | 370/465 |

FOREIGN PATENT DOCUMENTS

JP   10-084346   3/1998

* cited by examiner

Primary Examiner—Chi H Pham
Assistant Examiner—Warner Wong
(74) Attorney, Agent, or Firm—Whitham Curtis Christofferson & Cook, PC

(57) ABSTRACT

A packet scheduling apparatus corrects an overhead amount between a DSL rate and a packet rate, converts DSL rate information to the packet rate, and shapes the IP packets from the Internet such that the IP packets are delivered at a transmission rate equal to or lower than the packet rate. An IP/ATM converter converts the IP packets from the packet scheduling apparatus to ATM cells. A DSL multiplexer has a DSL current rate detector for supplying DSL rate information indicative of a currently set DSL rate, and transmits the ATM cells from the IP/ATM converter or the IP packets from the packet scheduling apparatus to user terminals through DSL processing using telephone lines.

12 Claims, 7 Drawing Sheets

NETWORK CONNECTION SYSTEM AND TRAFFIC SHAPING METHOD FOR FACILITATING SHAPING TRAFFIC EVEN IN NETWORK WHICH ACCOMMODATES LINES BASED ON DIFFERENT PROTOCOLS

BACKGROUND OF THE INVENTION

1. Field of the Invention

The present invention relates to a network connection system for connecting a communication network and a plurality of user terminals, and more particularly, to a traffic shaping method for shaping the transmission rate for IP packets from the Internet which is one type of IP network.

2. Description of the Related Art

In recent years, a variety of DSL techniques, represented by ADSL (Asynchronous Digital Subscriber Line), have become increasingly popular because of the ability to make a high speed connection with the Internet.

FIG. 1 illustrates the configuration of a conventional network connection system which employs such a DSL technique.

In the illustrated conventional system, user terminal 5 such as a personal computer is connected to Internet 7, which is an IP network, through a telephone central office 106. Then, telephone central office 106 is equipped therein with IP (Internet Protocol)/ATM (Asynchronous Transfer Mode) converter 3 and DSL multiplexer 101 which are interconnected through ATM network 2. While FIG. 1 illustrates that only one user terminal 5 is connected to DSL multiplexer 101, a large number of user terminals are actually connected to DSL multiplexer 101 through respective telephone lines.

IP/ATM converter 3 acts as a protocol converter for converting IP packets from Internet 7 to ATM cells.

DSL multiplexer 101 performs telephone line-based DSL processing by multiplexing and demultiplexing with a large number of user terminals 5, termination, and the like.

Such a network connection system enables high speed data communications between user terminal 5 and Internet 7 using a telephone line without the need for providing a special line to user terminal 5.

Also, in the DSL technique, a bandwidth is set for use in hand-shaking for setting a DSL line. For this purpose, DSL multiplexer 101 shapes cells to be transmitted such that the transmission rate of multiplexed ATM cells will not exceed the set DSL bandwidth. The shaping refers to a function of adjusting the transmission rate of cells in accordance with a set bandwidth, and is implemented, for example, using a token buffer.

In the conventional system, DSL multiplexer 101 shapes the transmission rate for ATM cells to be transmitted to user terminal 5 with a bandwidth (transmission rate) which has been set in the event of hand-shaking. However, since the telephone line situation fluctuates due to the influence of external noise and the like, techniques have been proposed for changing a used bandwidth while a line is in connection.

Japanese patent laid open No. 10-84346, for example, discloses a dynamic shaping apparatus which changes the rate at which cells are shaped, corresponding to a change in the rate even when a set bandwidth is changed during a connection of a line as mentioned above, In the conventional network connection system described above, IP packets from Internet 7 are converted to ATM cells by IP/ATM converter 3 before they are transmitted to user terminal 5 through DSL multiplexer 101. However, IP packets from Internet 7 are transmitted to user terminal 5 as is without conversion to ATM cells.

The conventional network connection system illustrated in FIG. 1 relies on a cell-based DSL technique, wherein IP packets transmitted to telephone central office 106 through Internet 7 are converted to ATM cells in IP/ATM converter 3, followed by a transfer of the ATM cells to user terminal 5. In recent years, however, a packet-based DSL technique has been proposed for transferring IP packets from Internet 7 to user terminal 5 without conversion of the IP packets to ATM cells. However, since DSL multiplexer 101 must accommodate as many as approximately 1000-2000 user terminals, cell-based DSL will be mixed with packet-based DSL.

FIG. 2 illustrates another conventional network connection system as mentioned above. In the system illustrated in FIG. 2, telephone central office 206 is equipped with DSL multiplexer 201. This DSL multiplexer 201 is capable of directly transmitting IP packets from Internet 7 to user terminal 5. However, when DSL multiplexer 201 accommodates a mixture of cell-based DSL and packet-based DSL in this way, complicated processing is required for controlling DSL multiplexer 201 such that the transmission rate of data transmitted to user terminal 5 falls within the previously set DSL rate in a method similar to before. The reason will be discussed below as to the requirement of complicated processing.

As shown in FIG. 3, each of ATM cells is provided with a header when IP packets are converted to ATM cells. With the header added to each ATM cell, the IP packets differs from the ATM cells in the transmission rate even if the same data is to be transmitted. For this reason, the ATM cells and IP packets cannot be controlled for shaping on the same basis, resulting in the need for the shaping control conducted with different bases, respectively.

Further, in recent years, a variety of Internet-based services have been proposed and utilized, including IP telephone, viewing of moving images, and the like. However, a problem will arise if a variety of such services are provided in the same communication quality. While a slight delay will not cause a problem with such services as viewing of Web pages and E-mail, interrupted transmission of data during IP telephone or viewing of a moving image would threaten the establishment of such services. It is therefore necessary to change the communication quality based on the contents of provided services.

To meet this requirement, conventionally, a constant bit rate (CBR) service has been applied to services such as the IP telephone and viewing of moving image, for which a constant communication quality should be ensured, to assign a constant cell rate, while a variable bit rate (VBR) service has been applied to services such as a Web page search for which a certain transmission rate need not be ensured.

It is contemplated, however, that a variety of types of services will be provided through the Internet as well in the future. Presumably, a variety of guaranteed class services will be provided through the same line, such as services for which a minimum rate is guaranteed, in addition to simply those services which are provided with priority, and best-effort services which are not provided with priority.

However, in the conventional system described above, complicated processing is involved if DSL multiplexer 201 processes data conforming to two different protocols, i.e., ATM cells and IP packets which cannot be controlled in accordance with the same basis, while a minimum rate is guaranteed for a particular service. The conventional system would therefore encounter difficulties in implementing a QoS (Quality of Service) control with a variety of quality guaranteed classes set therein.

Further, in the conventional network connection system, as the number of user terminals 5 increases, a plurality of DSL multiplexers 201 are additionally provided for accommodating extra lines. However, since the traffic must be shaped in each of the plurality of DSL multiplexers 201, a resulting increase in a management cost and a development cost will impede a reduction in overall cost.

SUMMARY OF THE INVENTION

It is an object of the present invention to provide a network connection system which facilitates the shaping in accordance with a set DSL rate when a cell-based DSL and a packet-based DSL are accommodated in mixture.

It is another object of the present invention to provide a network connection system which is capable of accommodating a mixture of a cell-based DSL and a packet-based DSL, preventing a rate after multiplexing from exceeding a set DSL rate when a variety of quality guaranteed classes of services are multiplexed for transmission, and realizing services of minimum rate guaranteed class.

To achieve the above objects, the present invention provides a network connection system for connecting a first communication network and a plurality of user terminals when a second communication network is interposed between the first communication network and the plurality of user terminals, wherein the second communication network employs a second protocol different from a first protocol employed in the first communication network. The system includes a scheduling apparatus, a protocol converter, and a multiplexer.

The scheduling apparatus has an overhead amount correction unit for correcting an overhead amount between data conforming to the second protocol and data conforming to the first protocol to convert received information on a rate based on the second protocol to a rate based on the first protocol, and a scheduler for shaping a transmission rate for data conforming to the first protocol from the first communication network such that the data conforming to the first protocol is delivered at a transmission rate equal to or lower than the rate calculated by the overhead amount correction unit.

The protocol converter converts the data conforming to the first protocol after the scheduling apparatus has shaped the transmission rate therefor to data conforming to the second protocol for use in the second network.

The multiplexer has a current data detector for supplying the scheduling apparatus with the rate information as indicative of a currently set reception rate for the user terminals, transmits to each of the user terminals the data conforming to the second protocol from the protocol converter or the data conforming to the first protocol after the scheduling apparatus has shaped the transmission rate therefor.

In the present invention, the current reception rate set for the user terminals, notified by the current rate detector, is converted to the rate based on the second protocol by the overhead amount correction unit of the scheduling apparatus. Then, this rate is relied on by the protocol converter to shape the transmission rate for the data conforming to the first protocol before the conversion to the data conforming to the second protocol. In consequence, even when the multiplexer accommodates a mixture of lines based on the second protocol and lines based on the first protocol, the shaping can be readily accomplished in accordance with a set reception rate.

Another network connection system according to the present invention includes a scheduling apparatus, a protocol converter, and a multiplexer.

The scheduling apparatus further has a classification processing unit, an overhead amount correction unit, a weighting coefficient calculation unit, a weighting scheduler, and a preferential control scheduler.

The classification processing unit classifies data conforming to the first protocol received from the communication network based on quality guaranteed classes set thereto.

The overhead amount correction unit corrects an overhead amount between a data rate associated with the first protocol and a data rate associated with the second protocol to convert received rate information on the second protocol to the rate based on the first protocol.

The weighting coefficient calculation unit calculates a weighting coefficient based on the rate calculated by the overhead amount correction unit such that a minimally guaranteed rate is assured for a minimum rate guaranteed class among classes classified by the classification processing unit.

The weighting scheduler schedules data conforming to the first protocol of the minimum rate guaranteed class and of a weighting applied class among the classified classes based on the weighting coefficient calculated by the weighting coefficient calculation unit to deliver the data in accordance with the scheduling.

The preferential control scheduler schedules the data conforming to the first protocol from the weighting scheduler, and data conforming to the first protocol of a best-effort class among the classified classes such that the data conforming to the first protocol is delivered at a transmission rate equal to or lower than the rate calculated by the overhead amount correction unit, preferentially schedules the data conforming to the first protocol from the weighting scheduler, and delivers the data conforming to the first protocol of the best-effort class at a timing at which there is no data conforming to the first protocol from the weighting scheduler.

The protocol converter converts the data conforming to the first protocol after the scheduling apparatus has shaped the transmission rate therefor to data conforming to the second protocol.

The multiplexer has a current data detector for supplying the scheduling apparatus with the rate information as indicative of a currently set reception rate for the user terminals, and transmits to each of the user terminals the data conforming to the second protocol from the protocol converter or the data conforming to the first protocol after the scheduling apparatus has shaped the transmission rate therefor.

In the present invention, the current DSL rate notified by the DSL current rate detector is converted to a packet rate by the overhead amount correction unit of the packet scheduling apparatus, and this packet rate is relied on by an IP/ATM converter to shape the transmission rate for IP packets before they are converted to ATM cells. Thus, even when the multiplexer accommodates a mixture of a cell-based DSL and a packet-based DSL, the shaping can be readily accomplished in accordance with a set DSL rate. Further, according to the present invention, since the weighting coefficient is calculated for a minimum rate guaranteed class based on a packet rate calculated by the overhead amount correction unit, the network connection system can readily provide services belonging to the minimum rate guaranteed class while preventing the transmission rate after multiplexing from exceeding the set DSL rate.

In another network connection system according to the present invention, a scheduling apparatus includes a classification processing unit, a rate measuring unit, an overhead amount correction unit, a weighting coefficient calculation unit, a weighting scheduler, and a preferential control scheduler.

The classification processing unit classifies data conforming to the first protocol received from the communication network based on quality guaranteed classes set thereto.

The rate measuring unit measures a transmission rate for a preferential class among the classified classes.

The overhead amount correction unit corrects an overhead amount between a rate based on the second protocol and a rate based on the first protocol to convert received rate information on the second protocol to the rate based on the first protocol.

The weighting coefficient calculation unit calculates a weighting coefficient based on the rate calculated by the overhead amount correction unit and the transmission rate for the preferential class measured by the rate measuring unit such that a minimally guaranteed rate is assured for a minimum rate guaranteed class among the classes classified by the classification processing unit.

The weighting scheduler schedules data conforming to the first protocol of the minimum rate guaranteed class and of a weighting applied class among the classified classes based on the weighting coefficient calculated by the weighting coefficient calculation unit to deliver the data in accordance with the scheduling.

The preferential control scheduler schedules the data conforming to the first protocol of the preferential class, the data conforming to the first protocol from the weighting scheduler, and data conforming to the first protocol of a best-effort class among the classified classes such that the data conforming to the first protocol is delivered at a transmission rate equal to or lower than the rate calculated by the overhead amount correction unit. The preferential control scheduler further preferentially schedules the data conforming to the first protocol of the preferential class, preferentially schedules the data conforming to the first protocol from the weighting scheduler at a timing at which there is no data conforming to the first protocol of the preferential class, and delivers the data conforming to the first protocol of the best-effort class at a timing at which there is no data conforming to the first protocol from the weighting scheduler.

According to the present invention, even with the introduction of a preferential class which must be processed with the highest priority, a weighting coefficient is calculated for the minimum rate guaranteed class in consideration of the transmission rate for the preferential class, the minimum rate can be assured for the minimum rate guaranteed class while the preferential class is processed with the highest priority.

In another network connection system according to the present invention, a scheduling apparatus includes a classification processing unit, a rate measuring unit, an overhead amount correction unit, a preferential class upper limit setting unit, a weighting coefficient calculation unit, a weighting scheduler, and a preferential control scheduler.

The classification processing unit classifies data conforming to the first protocol received from the communication network based on quality guaranteed classes set thereto.

The rate measuring unit measures a transmission rate for a preferential class among the classified classes.

The overhead amount correction unit corrects an overhead amount between a rate based on the second protocol and a rate based on the first protocol to convert received rate information on the second protocol to the rate based on the first protocol.

The preferential class upper limit setting unit is operative when the difference between the transmission rate of the data conforming to the first protocol of the preferential class as measured by the rate measuring unit and the rate calculated by the overhead amount correction unit is lower than a minimally guaranteed rate for a minimum rate guaranteed class among the classes classified by the classification processing unit, and sets an upper limit to the transmission rate for the preferential class for shaping such that the minimally guaranteed rate can be assured for the minimum rate guaranteed class.

The weighting coefficient calculation unit calculates a weighting coefficient based on the rate calculated by the overhead amount correction unit and the transmission rate for the preferential class measured by the rate measuring unit such that a minimally guaranteed rate is assured for the minimum rate guaranteed class among the classes classified by the classification processing unit when the preferential class upper limit setting unit does not set the upper limit, and calculates a weighting coefficient based on the rate calculated by the overhead amount correction unit and the upper limit rate set by the preferential class upper limit setting unit such that the minimally guaranteed rate is assured for the minimum rate guaranteed class when the preferential class upper limit setting unit sets the upper limit.

The weighting scheduler schedules data conforming to the first protocol of the minimum rate guaranteed class and of a weighting applied class among the classified classes based on the weighting coefficient calculated by the weighting coefficient calculation unit to deliver the data in accordance with the scheduling.

The preferential control scheduler schedules the data conforming to the first protocol of the preferential class, the data conforming to the first protocol from the weighting scheduler, and data conforming to the first protocol of a best-effort class among the classified classes such that the data conforming to the first protocol is delivered at a transmission rate equal to or lower than the rate calculated by the overhead amount correction unit. The preferential control scheduler further preferentially schedules the data conforming to the first protocol of the preferential class, preferentially schedules the data conforming to the first protocol from the weighting scheduler at a timing at which there is no data conforming to the first protocol of the preferential class, and delivers the data conforming to the first protocol of the best-effort class at a timing at which there is no data conforming to the first protocol from the weighting scheduler.

The multiplexer in the present invention includes a current rate detector for supplying the scheduling apparatus with a currently set reception rate for the user terminals as information on the rate of the second protocol, and transmits data conforming to the second protocol from the protocol converter, or the data conforming to the first protocol after the shaping by the scheduling apparatus to each user terminal through DSL processing using a telephone line.

According to the present invention, though an upper limit is imposed to the preferential class, the minimum rate can be assured for the minimum rate guaranteed class without fail even when the preferential class is introduced into the network.

Alternatively, in the present invention, the preferential class upper limit setting unit and weighting coefficient calculation unit may know the transmission rate for the preferential class using information fed back from the user terminals without providing the rate measuring unit.

Further, in the present invention, the current rate detector may periodically apply the rate information to the scheduling apparatus at regular time intervals, or may apply the rate information to the scheduling apparatus upon update of the reception rate set for the user terminals. Alternatively, the current rate detector may supply the scheduling apparatus with the rate information as indicative of a reception rate for the user terminal set between a user terminal and the multiplexer in the event of hand-shaking.

The above and other objects, features and advantages of the present invention will become apparent from the following description with reference to the accompanying drawings which illustrate examples of the present invention.

DETAILED DESCRIPTION OF THE PREFERRED EMBODIMENTS

First Embodiment

Figure 4:
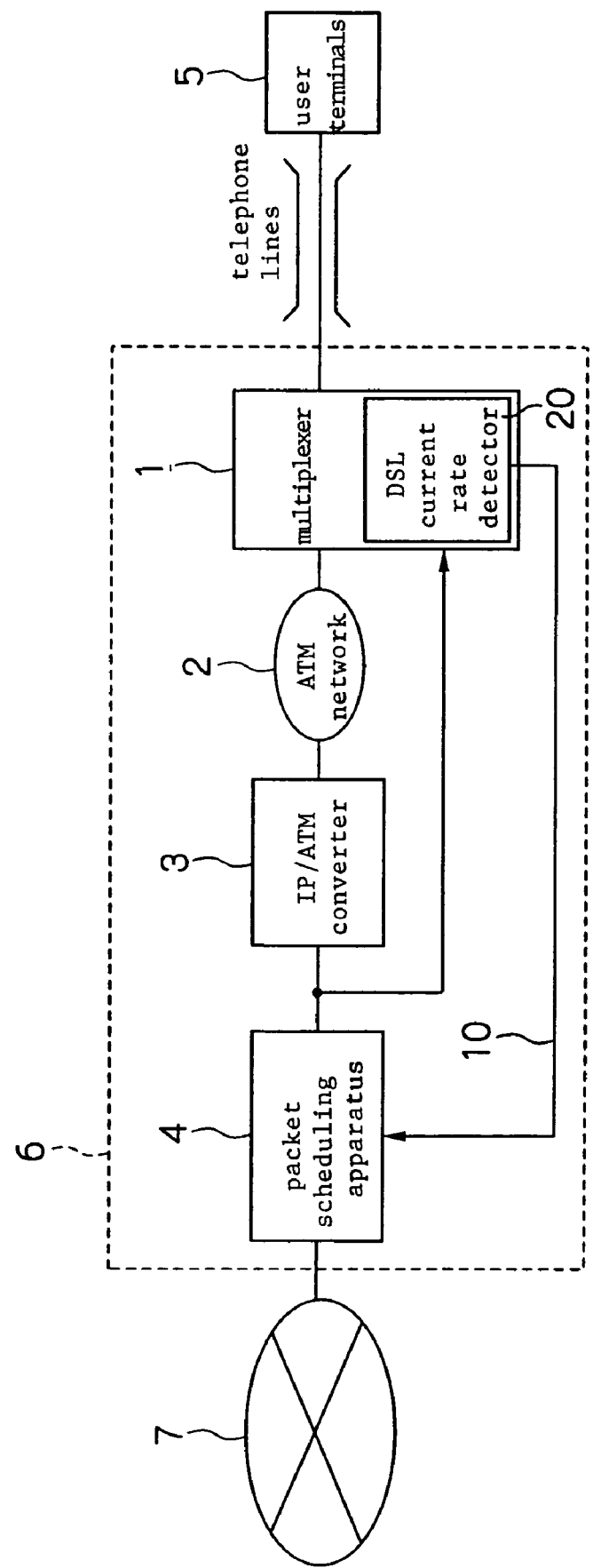
FIG. 4 is a block diagram illustrating the configuration of a network connection system according to a first embodiment of the present invention.

FIG. 4 is a block diagram illustrating the configuration of a network connection system according to a first embodiment of the present invention. In FIG. 4 components identical to those in FIG. 2 are designated the same reference numerals, and repeated description thereon is omitted.

In the network connection system of the first embodiment, user terminal 5 is connected to Internet 7 through telephone central office 6.

Figure 1:
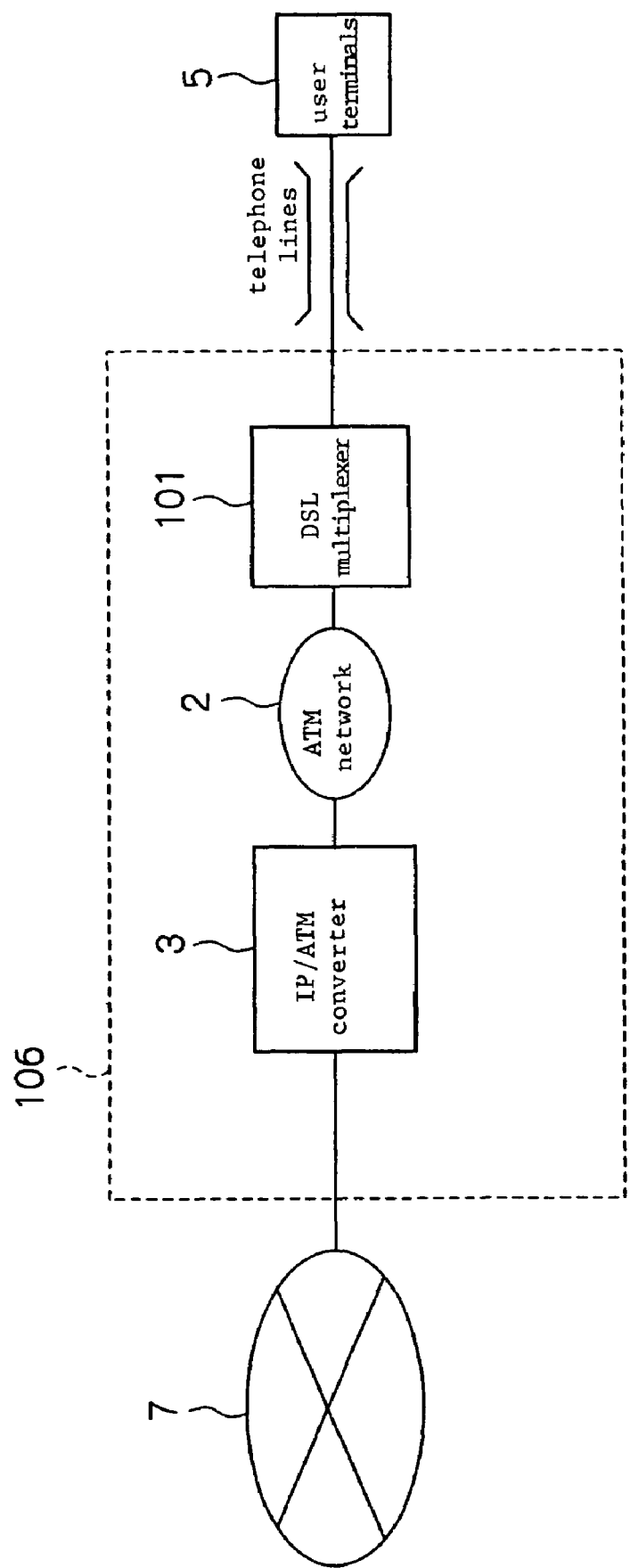
FIG. 1 is a block diagram illustrating the configuration of a conventional network connection system.
Figure 2:
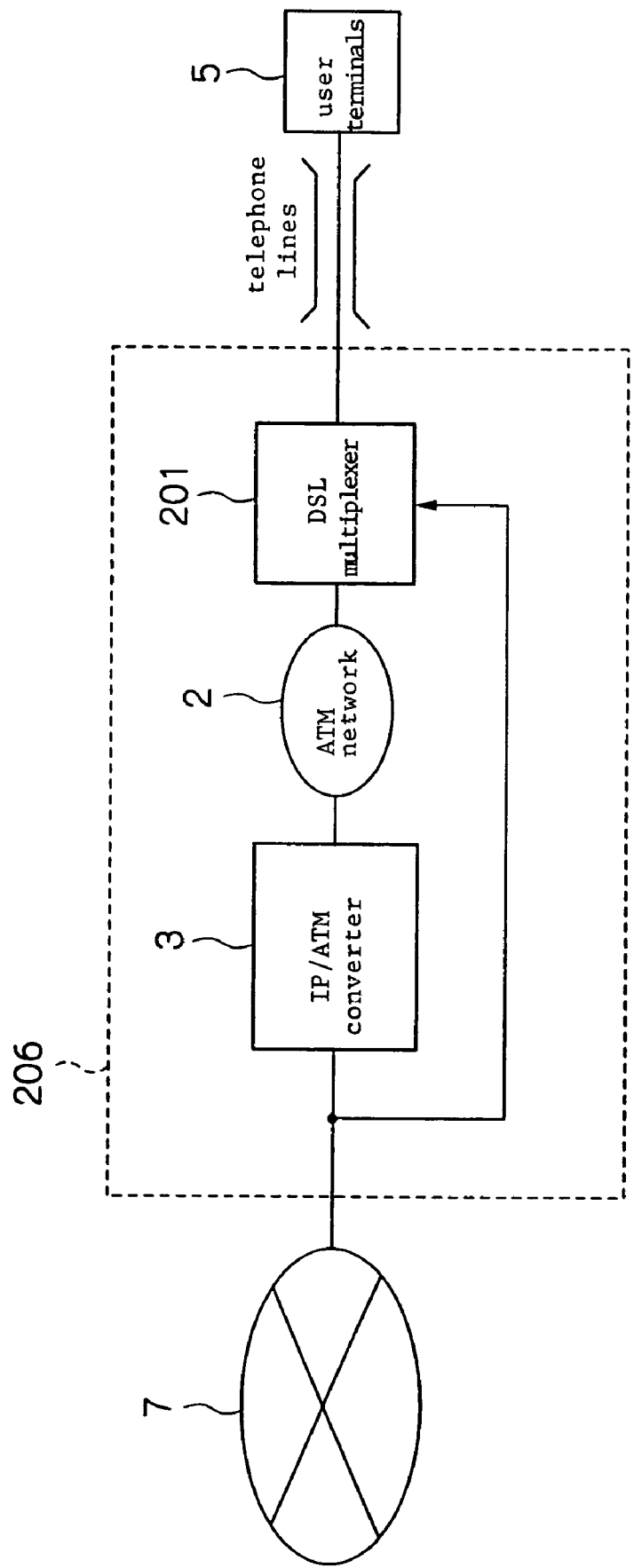
FIG. 2 is a block diagram illustrating the configuration of another conventional network configuration system.
Figure 3:
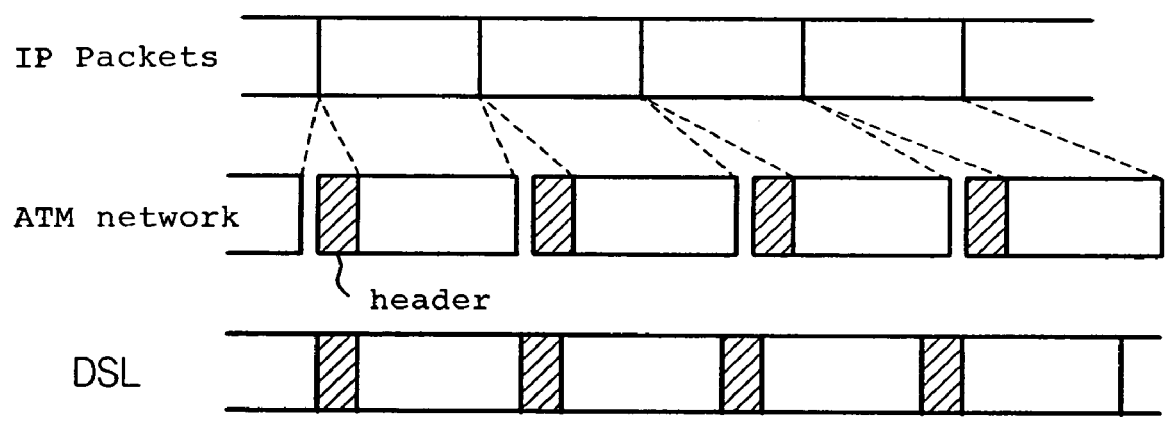
FIG. 3 is a diagram for describing the difference in overhead amount in the transmission rate between IP packets and ATM cells.

Telephone central office 6 in the first embodiment is provided with packet scheduling apparatus 4 between Internet 7 and IP/ATM converter 3, and DSL multiplexer 201 in FIG. 2 is replaced with DSL multiplexer 1.

DSL multiplexer 1 differs from DSL multiplexer 201 in the conventional network connection system illustrated in FIG. 2 in that DSL current rate detector 20 is provided.

DSL current rate detector 20 delivers DSL rate information 10 which represents a current DSL rate set between DSL multiplexer 1 and user terminal 5, i.e., a reception rate of user terminal 5.

Here, DSL current rate detector 20 may periodically deliver DSL rate information 10 at regular time intervals, or delivers DSL rate information 10 when the set DSL rate is changed. Alternatively, DSL current rate detector 20 may apply packet scheduling apparatus 4 with DSL rate information 10 which represents a DSL rate set between DSL multiplexer 1 and user terminal 5 upon hand-shaking.

Figure 5:
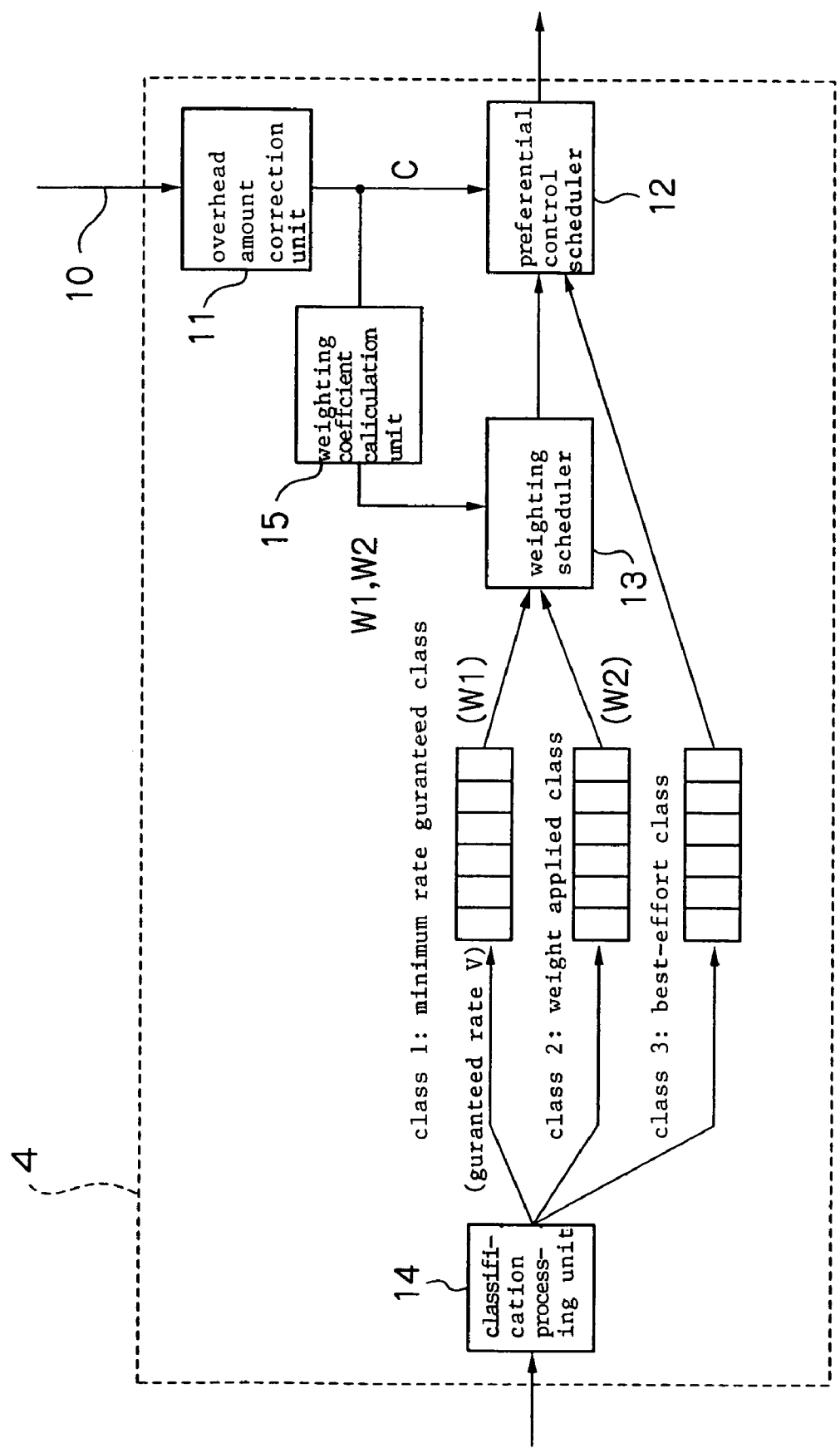
FIG. 5 is a block diagram illustrating the configuration of packet scheduling apparatus 4 in FIG. 4.

Next, FIG. 5 illustrates the configuration of packet scheduling apparatus 4 in FIG. 4. The following description is made on the assumption that Classes 1-3 are set for quality guaranteed classes. Class 1 is a quality guaranteed class which is guaranteed a minimum rate, wherein Class 1 is guaranteed that the transmission rate will not be equal to or lower than minimally guaranteed rate V. Class 2 is a weighting applied class which is not provided with the quality guarantee as above, but is guaranteed a quality higher than the best-effort class. Class 3 is the best-effort class which is not guaranteed the quality.

As illustrated in FIG. 5, packet scheduling apparatus 4 comprises overhead amount correction unit 11, preferential control scheduler 12, weighting scheduler 13, and classification processing unit 14.

Classification processing unit 14 classifies IP packets received from Internet 7 based on the set quality guaranteed classes.

Overhead amount correction unit 11 corrects an overhead amount between the DSL rate and packet rate to convert DSL rate information 10 from current rate detector 20 in DSL multiplexer 1 to a packet rate. Here, description is made on the assumption that the packet rate is indicated by C (bps) after the DSL rate communicated by DSL rate information 10 has been corrected for the overhead amount.

Weighting coefficient calculation unit 15 calculates weighting coefficients W1, W2 based on packet rate C calculated by overhead amount correction unit 11 so as to guarantee minimally guaranteed rate V (bps) for Class 1 which is the minimum rate guaranteed class.

For example, when packet rate C is exceeded by a total of the traffic of Class 1 which is guaranteed the minimum rate and Class 2 which is not guaranteed the minimum rate, but is only applied with weighting, weighting coefficient calculation unit 15 calculates weighting coefficient W1 for Class 1 and weighting coefficient W2 for Class 2 which is not guaranteed the minimum rate by the following equations:

$$W1=V/C,\ W2=1-W1$$

In another case, where Class 1 and Class 2 are guaranteed minimum rates V1 and V2, respectively, but packet rate C is not exceeded by a total of the traffic of Class 1 and Class 2, weighting coefficient calculation unit 15 may assign weighting coefficients W1, W2 for Classes 1, 2 in proportion to minimally guaranteed rates V1, V2, respectively:

$$W1=V1/(V1+V2),\ W2=V2/(V1+V2)$$

In a further case, where packet rate C is not exceeded by a total of the traffic of Class 1 and Class 2, Classes 1 and 2 are guaranteed minimum rates V1, V2, respectively, but a residual bandwidth is preferentially allocated to Class 1, weighting coefficient calculation unit 15 may calculate weighting coefficients W1, W2 for Classes 1, 2 as expressed by the following equations:

$$W2=V/C,\ W1=1-W2$$

While several specific examples have been shown above for the calculation of weighting coefficients W1, W2, the present invention is not limited to this method of calculating the weighting coefficients. The present invention can be applied to any calculation, method as long as weighting coefficient calculation unit 15 calculates weighting coefficients based on packet rate C calculated by overhead amount correction unit 11 so as to guarantee the minimally guaranteed rate for a class which should be guaranteed the minimum rate.

Weighting scheduler 13 schedules IP packets of Class 1 and Class 2 based on weighting coefficients W1, W2 calculated by weighting coefficient calculation unit 15, and delivers the IP packets to preferential control scheduler 12.

Specific weighting method used herein may be a round-robin based weighting method, and the like.

Preferential control scheduler 12 schedules the IP packets from weighting scheduler 13 and IP packets of Class 3 which is the best-effort class, such that the transmission rate of IP packets to be delivered is equal to or lower than packet rate C calculated by overhead amount correction unit 11. Also, preferential control scheduler 12 preferentially schedules IP packets from weighting scheduler 13, and delivers IP packets of Class 3, which is the best-effort class, at a timing at which no IP packet is delivered from weighting scheduler 13.

Preferential control scheduler 12 may be implemented, for example, by using a token buffer which is provided with tokens at packet rate C calculated by overhead amount correction unit 11, and controlling the resulting rate.

Next, the operation in the network connection system according to the first embodiment will be described with reference to the drawings.

The following description is made on the assumption that Class 1, which is the minimum rate guaranteed class, is guaranteed minimum rate V of 5 M (bps).

First, in DSL multiplexer 1, DSL current rate detector 20 transmits DSL rate information 10 which represents the currently set DSL rate to packet scheduling apparatus 4. Assume herein that the current DSL rate is set at 8 M(bps).

Upon receipt of DSL rate information 10 from DSL multiplexer 1, packet scheduling apparatus 44 converts the DSL rate detected in overhead amount correction unit 11 to a packet rate. Assume herein that since the current DSL rate is 8 M (bps), packet rate C corrected for the overhead amount is calculated to be 7 M (bps).

Then, weighting coefficient calculation unit 15 calculates weighting coefficient W1 for Class 1 as W1=5/7 because minimally guaranteed rate V for Class 1 is 5 M (bps). Further, weighting coefficient calculation unit 15 calculates weighting coefficient W2 for Class 2 as W2=1−5/7=2/7.

Weighting scheduler 13 schedules IP packets of Class 1 and IP packets of Class 2 based on weighting coefficients W1 (=5/7), W2 (=2/7) calculated by weighting coefficient calculation unit 15, and delivers the IP packets to preferential control scheduler 12. Preferential control scheduler 12 shapes the IP packets from weighting scheduler 13 with packet rate C (=7 M (bps)) calculated by overhead amount correction unit 11, and delivers the shaped IP packets.

As previously described, in the network connection system of this embodiment, the current DSL rate notified by current rate detector 20 is converted to packet rate C by overhead amount correction unit 11 of packet scheduling apparatus 4, and this packet rate C is relied on to shape the transmission rate of the IP packets before they are converted to ATM cells in IP/ATM converter 3, so that the shaping can be readily performed in accordance with the set DSL rate even if a cell-based DSL and a packet-based DSL are accommodated in mixture.

Also, according to the network connection system of this embodiment, since the weighting coefficient is calculated for Class 1, which is guaranteed the minimum rate, based on packet rate C calculated by overhead amount correction unit 11, services in the minimum rate guaranteed class can be readily provided while the transmission rate after multiplexing is prevented from exceeding the set DSL rate.

Second Embodiment:

Next, description will be Made on a network connection system according to a second embodiment of the present invention with reference to FIG. 6.

Figure 6:
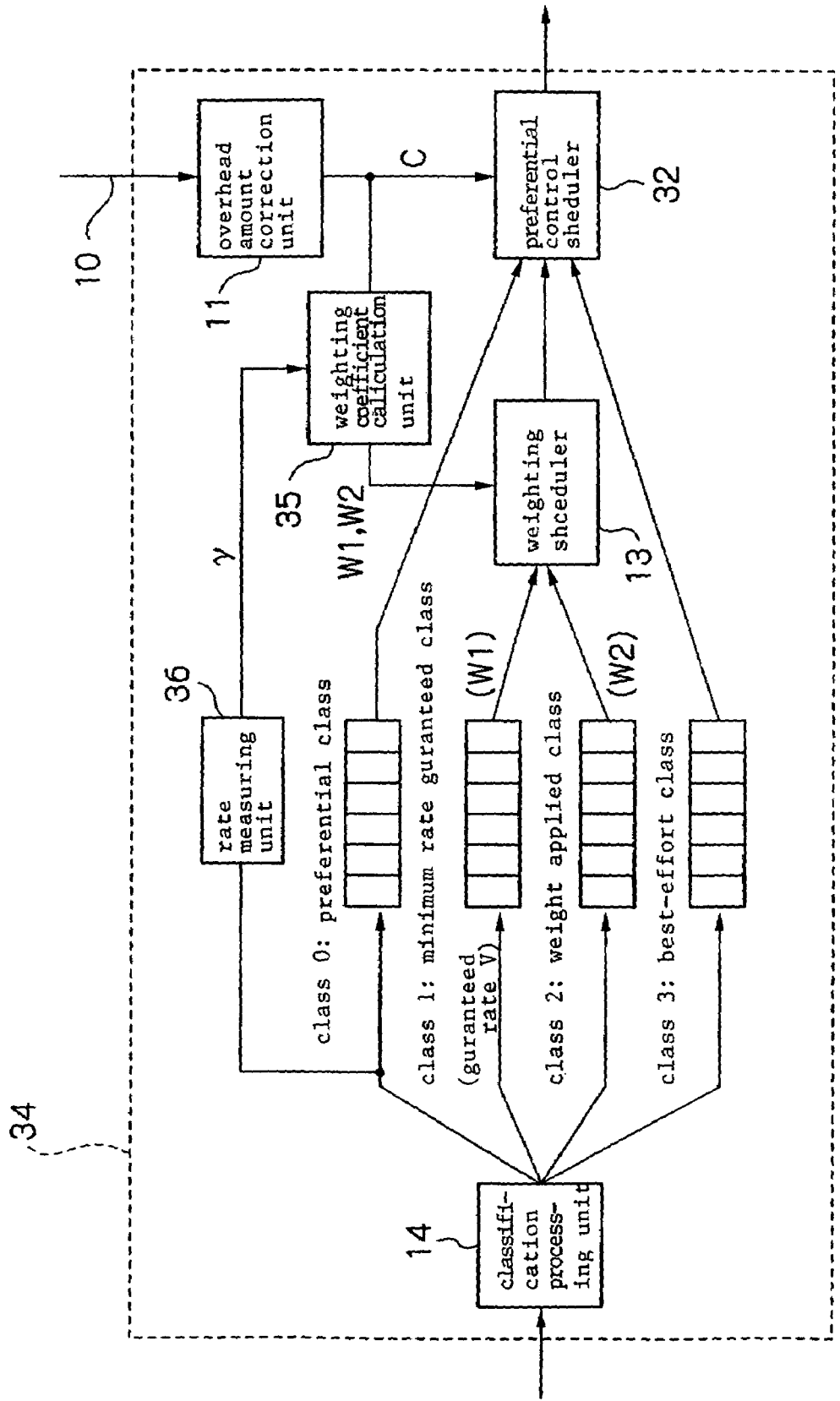
FIG. 6 is a block diagram illustrating the configuration of packet scheduling apparatus 34 in a network connection system according to a second embodiment of the present invention.

The network connection system of the second embodiment has packet scheduling apparatus 34 shown in FIG. 6 which is substituted for packet scheduling apparatus 4 in the network connection system of the first embodiment illustrated in FIG. 4.

The configuration of packet scheduling apparatus 34 in the network connection system according to the second embodiment of the present invention will be described with reference to a block diagram of FIG. 6. In FIG. 6, components identical to those in FIG. 5 are designated the same reference numerals, and repeated description thereon is omitted.

The second embodiment provides an additional quality guaranteed class, i.e., Class 0 which is the most preferential class which is processed with the highest priority, in addition to Classes 1, 2, 3 described in the first embodiment.

Packet scheduling apparatus 34 in the second embodiment differs from packet scheduling apparatus 4 illustrated in FIG. 5 in that preferential control scheduler 32 is substituted for preferential control scheduler 12, weighting coefficient calculation unit 35 is substituted for weighting coefficient calculation unit 15, and rate measuring unit 36 is additionally provided.

Rate measuring unit 36 measures transmission rate r (bps) for Class 0, which is the most preferential class, and supplies transmission rate r to weighting coefficient calculation unit 35. Since specific means for measuring the transmission rate can be implemented by a general expedient, detailed description thereon is omitted here.

Weighting coefficient calculation unit 35 stores transmission rate r of Class 0 measured by rate measuring unit 36, and calculates weighting coefficients W1, W2 based on packet rate C calculated by overhead amount correction unit 11 and stored transmission rate r for Class 0, such that minimally guaranteed rate V (bps) is ensured for Class 1 which is a minimum rate guaranteed class.

Specifically, weighting coefficient calculation unit 35 calculates weighting coefficient W1 for Class 1 which is guaranteed the minimum rate, for example, by the following equation:

$$W1=V/(C-r)$$

Then, weighting coefficient calculation unit 35 calculates weighting coefficient W2 for Class 2, which is not guaranteed the minimum rate, by the following equation in a manner similar to the aforementioned first embodiment:

$$W2=1-W1$$

In a case, where Class 1 and Class 2 are guaranteed the minimum rates V1 and V2, respectively, but the total traffic of Class 1 and Class 2 will not exceed rate C−r which is calculated by subtracting transmission rate r for Class 0 from packet rate C, weighting coefficient calculation unit 35 may apply weighting coefficients W1, W2 to Classes 1, 2 in proportion to minimally guaranteed rates V1, V2:

$$W1=V1/(V1+V2),$$

$$W2=V2/(V1+V2)$$

In a further case, where rate C−r is not exceeded by the total traffic of Class 1 and Class 2, Class 1 and Class 2 are guaranteed minimum rates V1, V2, respectively, but a residual bandwidth is preferentially allocated to Class 1, weighting coefficient calculation unit 35 may calculate weighting coefficients W1, W2 for Classes 1, 2 as expressed by the following equations:

$$W2=(V-r)/C,$$

$$W1=1-W2$$

While several specific examples have been shown above for the calculation of weighting coefficients W1, W2, the present invention is not limited to this method of calculating the weighting coefficients. The present invention can be applied to any calculation method as long as weighting coefficient calculation unit 35 calculates weighting coefficients based on packet rate C calculated by overhead amount correction unit 11 and transmission rate r for Class 0 measured by rate measuring unit 36 so as to guarantee the minimally guaranteed rate for a class which should be guaranteed the minimum rate.

Preferential control scheduler 32 processes IP packets of Class 0, which is the most preferential class, with the highest priority, and schedules IP packets from weighting scheduler 13 and IP packets of Class 3 through similar processing to preferential control scheduler 12 in the first embodiment in a empty band in which there are no IP packets of Class 0.

Specifically, preferential control scheduler 32 preferentially schedules IP packets of Class 0; preferentially schedules IP packets from weighting scheduler 13 in a band in which there are no IP packets of Class 0; and delivers IP packets of Class 3, which is a best-effort class, at a timing at which there are no IP packets from weighting scheduler 13.

Preferential control scheduler 32 further schedules IP packets of the preferential class, IP packets from weighting scheduler 13, and IP packets of best-effort Class 3 such that the transmission rate of IP packets delivered therefrom is equal to or lower than packet rate C calculated by overhead amount correction unit 11.

The network connection system according to the second embodiment can also support a preferential class which must be processed with the highest priority, and ensure the minimum rate for Class 1, while processing IP packets of Class 0 with the highest priority, because weighting coefficient W1 is calculated for Class 1 which is guaranteed the minimum rate in consideration of the transmission rate of Class 0 which is the preferential class.

In the second embodiment, transmission rate r for preferential Class 0 may be set at a constant value or may be updated at regular time intervals. When transmission rate r for Class 0 is updated at regular time intervals, weighting coefficient calculation unit 35 calculates weighting coefficients W1, W2 using updated transmission rate r, as a matter of course.

Also, while the foregoing embodiment has been described in connection with the network connection system which comprises rate measuring unit 36 for measuring transmission rate r for Class 0, information fed back from user terminal 5 may be used to set transmission rate r for Class 0 in weighting coefficient calculation unit 35.

Third Embodiment:

Next, description will be made on a network connection system according to a third embodiment of the present invention with reference to FIG. 7.

Figure 7:
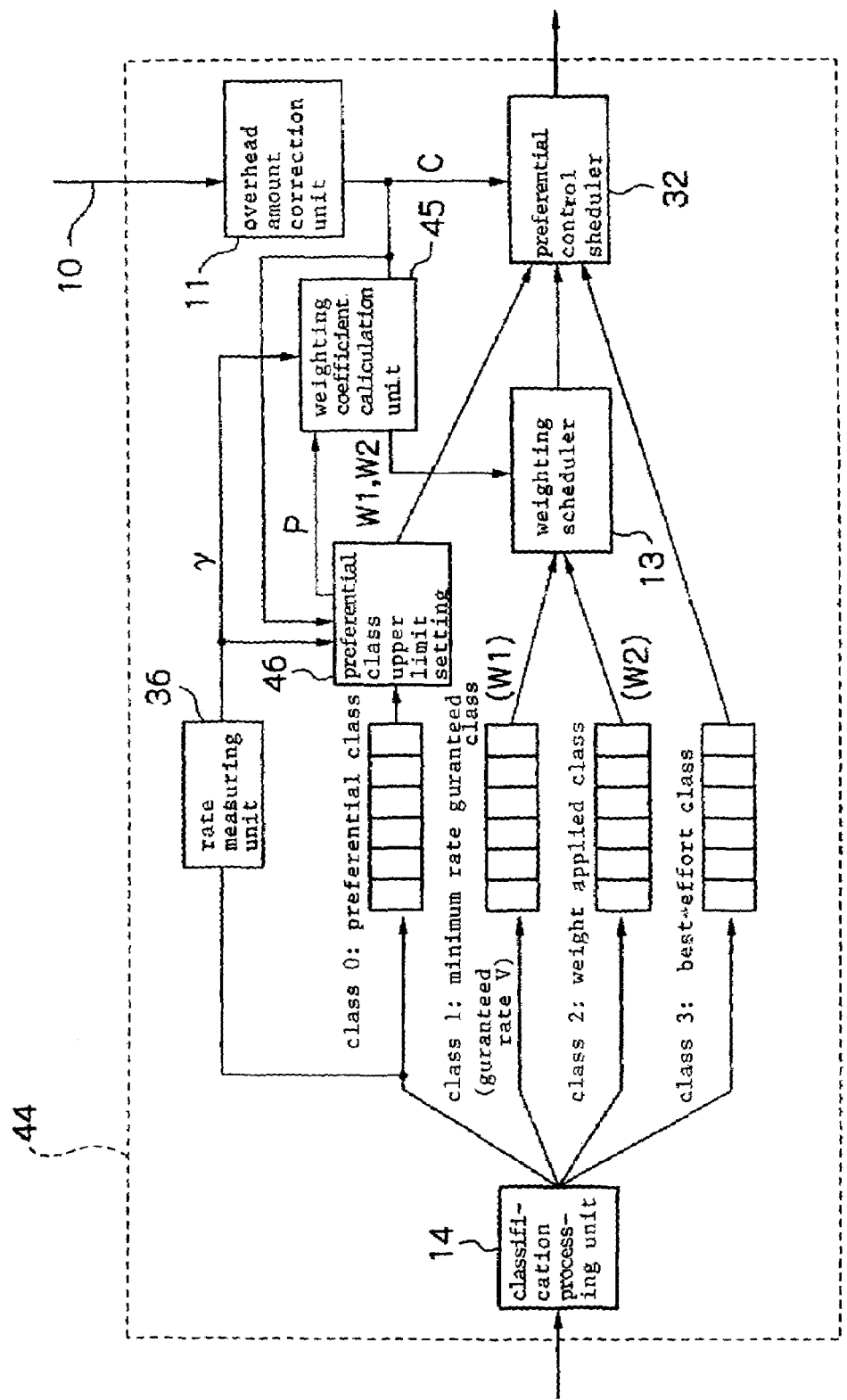
FIG. 7 is a block diagram illustrating the configuration of packet scheduling apparatus 44 in a network connection system according to a third embodiment of the present invention.

The network connection system according to the third embodiment has packet scheduling apparatus 44 illustrated in FIG. 7 which is substituted for packet scheduling apparatus 4 in the network connection system of the first embodiment illustrated in FIG. 4.

The configuration of packet scheduling apparatus 44 in the network connection system according to the third embodiment of the present invention will be described with reference to a block diagram of FIG. 7. In FIG. 7, components identical to those in FIG. 6 are designated the same reference numerals, and repeated description is omitted.

In the second embodiment described above, IP packets of preferential Class 0 are given the highest priority in processing without imposing an upper limit thereto. With this strategy, when transmission rate r for IP packets of Class 0 increases so that the difference between transmission rate r and packet rate C calculated by overhead amount correction unit 11 is smaller than minimally guaranteed rate V for Class 1, this minimally guaranteed rate V cannot be assured for Class 1. The network connection system of the third embodiment is intended to assure the minimum rate for Class 1 by setting an upper limit for the preferential class.

Packet scheduling apparatus 34 in the third embodiment additionally comprises preferential class upper limit setting unit 46, and weighting coefficient calculation unit 45 which is substituted for weighting coefficient calculation unit 35 of packet scheduling apparatus 4 illustrated in FIG. 5.

Preferential class upper limit setting unit 46 shapes the transmission rate for preferential Class 0 by imposing upper limit rate p (bps) calculated by the following equation, when transmission rate r for IP packets of Class 0 increases so that the difference between transmission rate r and packet rate C calculated by overhead amount correction unit 11 is smaller than minimally guaranteed rate V for Class 1, i.e., when C−r<V:

$$p = C - V$$

Preferential class upper limit setting unit 46 additionally notifies weighting coefficient calculation unit 45 of the value of upper limit rate p when it is set for Class 0.

Then, upon receipt of a notice from preferential class upper limit setting unit 46 indicating that upper limit rate p has been set for preferential Class 0, weighting coefficient calculation unit 45 in the third embodiment calculates weighting coefficient W1 for Class 1, which is guaranteed the minimum rate, in accordance with the following equation:

$$W1 = V/(C-p)$$

Then, weighting coefficient calculation unit 45 calculates weighting coefficient W2 for Class 2, which is not guaranteed the minimum rate, in accordance with the following equation, as is the case with the aforementioned first and second embodiments:

$$W2 = 1 - W1$$

Also, for guaranteeing minimum rates V1, V2 for Class 1 and Class 2, respectively, preferential class upper limit setting unit 46 shapes the transmission rate for preferential Class 0 by imposing upper limit rate p (bps) calculated by the following equation, when the difference between transmission rate r and packet rate C calculated by overhead amount correction unit 11 is smaller than the sum of the minimum rates V1, V2 guaranteed for Classes 1, 2 (V1+V2), i.e., when C−r<V1+V2:

$$p = C - (V1 + V2)$$

In this event, weighting coefficient calculation unit 45 applies weighting coefficients W1, W2 to Classes 1, 2 in proportion to minimally guaranteed rates V1, V2, as expressed by the following equations:

$$W1 = V1/(V1+V2),$$

$$W2 = V2/(V1+V2)$$

Weighting coefficient calculation unit 45 in the third embodiment performs similar operations to those of weighting coefficient calculation unit 35 in the second embodiment except when it receives a notice from preferential class upper limit setting unit 46 indicating that upper limit rate p has been set for Class 0.

According to the third embodiment, while an upper limit is imposed to preferential Class 0, the minimum rate can be assured for Class 1 without fail even when the preferential class is introduced.

While the network connection system of the third embodiment has been described in connection with preferential class upper limit setting unit 46 which shapes the transmission rate for preferential Class 0 with upper limit rate p calculated by $p = C - V$, the present invention is not limited to such a shaping scheme. Preferential class upper limit setting unit 46 may shape the transmission rate for a preferential class with whatever upper limit rate p, as long as the upper limit is set to the transmission rate for preferential Class 0 such that minimum rate V can be guaranteed for Class 1.

For example, when $C - r < V$, preferential class upper limit setting unit 46 may determine upper limit rate p by decreasing p step by step to satisfy $C - p > V$. Conversely, when packet rate C calculated by overhead amount correction unit 11 increases to satisfy $2V < C - p$, preferential class upper limit setting unit 46 may double the value of p after confirming that the doubling of p results in $V < C - 2p$.

The foregoing first to third embodiments have been described in a scenario in which there are one each of preferential class and best-effort class, and two quality guaranteed classes which are weighted. The present invention, however, is not limited to this particular scheme, but can be applied as well when any number of quality guaranteed classes, which are weighted, any number of preferential classes, and any number of best-effort classes are combined in various manners.

Also, though not shown, packet scheduling apparatuses 4, 34, 44 in the first to third embodiments each comprise a recording medium which has recorded thereon a program for executing the packet scheduling method described above. This recording medium may be a magnetic disk, a semiconductor memory, or any other recording medium. The program is read into packet scheduling apparatus 4, 34 or 44 from the recording medium to control the operation of packet scheduling apparatus 4, 34 or 44. Specifically, a CPU within packet scheduling apparatus 4, 34 or 44 instructs hardware resources provided therein to perform particular processing under the control of the program, thereby implementing the foregoing processing.

Also, in the first to third embodiments, the present invention has been described in connection with the network connection system for connecting Internet 7 and a plurality of user terminals 5 when ATM network 2, which employs a protocol different from that employed in Internet 7, is interposed between Internet 7 and a plurality of user terminals 5. The present invention, however, is not limited to such a particular configuration, but can be applied as well to a network connection system for connecting a first communication network and a plurality of user terminals when a second communication network, which employs a second protocol different from a first protocol employed in the first communication network, is interposed between the first communication network and the plurality of user terminals.

Further, while the first to third embodiments have been described in a situation in which a cell-based DSL is mixed with a packet-based DSL within telephone central office 6, the present invention can be applied as well when the cell-based DSL alone or packet-based DSL alone is installed within telephone central office 6. In the latter case, even when the number of user terminals 5 increases so that a plurality of DSL multiplexers 1 are connected to ATM network 2, packet scheduling apparatus 4 can be installed for shaping immediately after the entry from Internet 7 into telephone central office 6 to save management cost and development cost, thereby leading to a reduction in overall cost.

In the first to third embodiments, overhead amount correction unit 11 converts DSL rate information 10 from DSL current rate detector 20 to packet rate C. When there is only a packet-based DSL, overhead amount correction unit 11 is not needed, as a matter of fact.

Further, in the first to third embodiments, quality guaranteed classes have been described with reference to the best-effort class, but the present invention can be applied as well to a system which does not employ the best-effort class.

While preferred embodiments of the present invention have been described using specific terms, such description is for illustrative purposes only, and it is to be understood that changes and variations may be made without departing from the spirit or scope of the following claims.

What is claimed is:

1. A network connection system for connecting a first communication network and a plurality of user terminals when a second communication network is interposed between said first communication network and said plurality of user terminals, said second communication network employing a second protocol different from a first protocol employed in said first communication network, said system comprising:
    a scheduling apparatus including:
        a classification processing unit for classifying data conforming to said first protocol received from said communication network based on quality guaranteed classes set thereto;
        an overhead amount correction unit for correcting an overhead amount between a data rate associated with said first protocol and a data rate associated with said second protocol to convert received rate information on said second protocol to the rate based on said first protocol;
        a weighting coefficient calculation unit for calculating a weighting coefficient based on said rate calculated by said overhead amount correction unit such that a minimally guaranteed rate is assured for a minimum rate guaranteed class among classes classified by said classification processing unit;
        a weighting scheduler for scheduling data conforming to said first protocol of said minimum rate guaranteed class and of a weighting applied class among said classified classes based on the weighting coefficient calculated by said weighting coefficient calculation unit to deliver the data in accordance with the scheduling; and
        a scheduler for scheduling the data conforming to said first protocol from said weighting scheduler such that the data conforming to said first protocol is delivered at a transmission rate equal to or lower than said rate calculated by said overhead amount correction unit to deliver the data in accordance with the scheduling;
    a protocol converter for converting the data conforming to said first protocol after said scheduling apparatus has shaped the transmission rate therefor to data conforming to said second protocol; and
    a multiplexer including a current data detector for supplying said scheduling apparatus with said rate information as indicative of a currently set reception rate for said user terminals, said multiplexer being configured to transmit to each of said user terminals the data conforming to said second protocol from said protocol converter or the data conforming to said first protocol after said scheduling apparatus has shaped the transmission rate therefor.

2. A network connection system for connecting a first communication network and a plurality of user terminals when a second communication network is interposed between said first communication network and said plurality of user terminals, said second communication network employing a second protocol different from a first protocol employed in said first communication network, said system comprising:

a scheduling apparatus including:

an overhead amount correction unit for correcting an overhead amount between a data rate associated with said first protocol and a data rate associated with said second protocol to convert received rate information on said second protocol to the rate based on said first protocol;

a weighting coefficient calculation unit for calculating a weighting coefficient based on said rate calculated by said overhead amount correction unit such that a minimally guaranteed rate is assured for the minimum rate guaranteed class among classes classified by said classification processing unit;

a weighting scheduler for scheduling data conforming to said first protocol of said minimum rate guaranteed class and of a weighting applied class among said classified classes based on the weighting coefficient calculated by said weighting coefficient calculation unit to deliver the data in accordance with the scheduling; and a preferential control scheduler for scheduling the data conforming to said first protocol from said weighting scheduler, and data conforming to said first protocol of a best-effort class among said classified classes such that the data conforming to said first protocol is delivered at a transmission rate equal to or lower than said rate calculated by said overhead amount correction unit, and for preferentially scheduling the data conforming to said first protocol from said weighting scheduler, and delivering the data conforming to said first protocol of the best-effort class at a timing at which there is no data conforming to said first protocol from said weighting scheduler;

a protocol converter for converting the data conforming to said first protocol after said scheduling apparatus has shaped the transmission rate therefor to data conforming to said second protocol; and a multiplexer including a current data detector for supplying said scheduling apparatus with said rate information as indicative of a currently set reception rate for said user terminals, said multiplexer being configured to transmit to each of said user terminals the data conforming to said second protocol from said protocol converter or the data conforming to said first protocol after said scheduling apparatus has shaped the transmission rate therefor.

3. A network connection system for connecting a first communication network and a plurality of user terminals when a second communication network is interposed between said first communication network and said plurality of user terminals, said second communication network employing a second protocol different from a first protocol employed in said first communication network, said system comprising:

a scheduling apparatus including:

a classification processing unit for classifying data conforming to said first protocol received from said communication network based on quality guaranteed classes set thereto;

a rate measuring unit for measuring a transmission rate for a preferential class among said classified classes;

an overhead amount correction unit for correcting an overhead amount between a rate based on said second protocol and a rate based on said first protocol to convert received rate information on said second protocol to the rate based on said first protocol;

a weighting coefficient calculation unit for calculating a weighting coefficient based on said rate calculated by said overhead amount correction unit and the transmission rate for the preferential class measured by said rate measuring unit such that a minimally guaranteed rate is assured for the minimum rate guaranteed class among the classes classified by said classification processing unit;

a weighting scheduler for scheduling data conforming to said first protocol of said minimum rate guaranteed class and of a weighting applied class among said classified classes based on the weighting coefficient calculated by said weighting coefficient calculation unit to deliver the data in accordance with the scheduling; and a preferential control scheduler for scheduling the data conforming to said first protocol of said preferential class, the data conforming to said first protocol from said weighting scheduler, and data conforming to said first protocol of a best-effort class among said classified classes such that the data conforming to said first protocol is delivered at a transmission rate equal to or lower than said rate calculated by said overhead amount correction unit, and for preferentially scheduling the data conforming to said first protocol of said preferential class, preferentially scheduling the data conforming to said first protocol from said weighting scheduler at a timing at which there is no data conforming to said first protocol of said preferential class, and delivering the data conforming to said first protocol of the best-effort class at a timing at which there is no data conforming to said first protocol from said weighting scheduler;

a protocol converter for converting the data conforming to said first protocol after said scheduling apparatus has shaped the transmission rate therefor to data conforming to said second protocol; and a multiplexer including a current data detector for supplying said scheduling apparatus with said rate information as indicative of a currently set reception rate for said user terminals, said multiplexer being configured to transmit to each of said user terminals the data conforming to said second protocol from said protocol converter or the data conforming to said first protocol after said scheduling apparatus has shaped the transmission rate therefor.

4. A network connection system for connecting a first communication network and a plurality of user terminals when a second communication network is interposed between said first communication network and said plurality of user terminals, said second communication network employing a second protocol different from a first protocol employed in said first communication network, said system comprising:

a scheduling apparatus including:

a classification processing unit for classifying data conforming to said first protocol received from said communication network based on quality guaranteed classes set thereto;

a rate measuring unit for measuring a transmission rate for a preferential class among said classified classes;

an overhead amount correction unit for correcting an overhead amount between a rate based on said second protocol and a rate based on said first protocol to convert received rate information on said second protocol to the rate based on said first protocol;

a preferential class upper limit setting unit, operative when the difference between the transmission rate of the data conforming to said first protocol of the preferential class as measured by said rate measuring unit and said rate calculated by said overhead amount correction unit is lower than a minimally guaranteed rate for a minimum rate guaranteed class among the classes classified by said classification processing unit, for setting an upper limit to the transmission rate for said preferential class for shaping, such that the minimally guaranteed rate can be assured for said minimum rate guaranteed class;

a weighting coefficient calculation unit, operative when said preferential class upper limit setting unit does not set the upper limit, for calculating a weighting coefficient based on said rate calculated by said overhead amount correction unit and the transmission rate for the preferential class measured by said rate measuring unit such that the minimally guaranteed rate is assured for the minimum rate guaranteed class among the classes classified by said classification processing unit, said weighting coefficient calculation unit being further operative when said preferential class upper limit setting unit sets the upper limit, for calculating a weighting coefficient based on said rate calculated by said overhead amount correction unit and the upper limit rate set by said preferential class upper limit setting unit such that the minimally guaranteed rate is assured for said minimum rate guaranteed class;

a weighting scheduler for scheduling data conforming to said first protocol of said minimum rate guaranteed class and of a weighting applied class among said classified classes based on the weighting coefficient calculated by said weighting coefficient calculation unit to deliver the data in accordance with the scheduling; and a preferential control scheduler for scheduling the data conforming to said first protocol of said preferential class, the data conforming to said first protocol from said weighting scheduler, and data conforming to said first protocol of a best-effort class among said classified classes, such that the data conforming to said first protocol is delivered at a transmission rate equal to or lower than said rate calculated by said overhead amount correction unit, and for preferentially scheduling the data conforming to said first protocol of said preferential class, preferentially scheduling the data conforming to said first protocol from said weighting scheduler at a timing at which there is no data conforming to said first protocol of said preferential class, and delivering the data conforming to said first protocol of the best-effort class at a timing at which there is no data conforming to said first protocol from said weighting scheduler;

a protocol converter for converting the data conforming to said first protocol after said scheduling apparatus has shaped the transmission rate therefor to data conforming to said second protocol; and a multiplexer including a current data detector for supplying said scheduling apparatus with said rate information as indicative of a currently set reception rate for said user terminals, said multiplexer being configured to perform DSL processing using telephone lines to transmit to each of said user terminals the data conforming to said second protocol from said protocol converter or the data conforming to said first protocol after said scheduling apparatus has shaped the transmission rate therefor.

5. A network connection system for connecting a first communication network and a plurality of user terminals when a second communication network is interposed between said first communication network and said plurality of user terminals, said second communication network employing a second protocol different from a first protocol employed in said first communication network, said system comprising:

a scheduling apparatus including:

a classification processing unit for classifying data conforming to said first protocol received from said communication network based on quality guaranteed classes set thereto;

an overhead amount correction unit for correcting an overhead amount between a rate based on said second protocol and a rate based on said first protocol to convert received rate information on said second protocol to the rate based on said first protocol;

a weighting coefficient calculation unit for calculating a weighting coefficient based on said rate calculated by said overhead amount correction unit and the transmission rate for a preferential class among said classified classes using information fed back from said user terminals such that a minimally guaranteed rate is assured for the minimum rate guaranteed class among the classes classified by said classification processing unit;

a weighting scheduler for scheduling data conforming to said first protocol of said minimum rate guaranteed class and of a weighting applied class among said classified classes based on the weighting coefficient calculated by said weighting coefficient calculation unit to deliver the data in accordance with the scheduling; and a preferential control scheduler for scheduling the data conforming to said first protocol of said preferential class, the data conforming to said first protocol from said weighting scheduler, and data conforming to said first protocol of a best-effort class among said classified classes such that the data conforming to said first protocol is delivered at a transmission rate equal to or lower than said rate calculated by said overhead amount correction unit, and for preferentially scheduling the data conforming to said first protocol of said preferential class, preferentially scheduling the data conforming to said first protocol from said weighting scheduler at a timing at which there is no data conforming to said first protocol of said preferential class, and delivering the data conforming to said first protocol of the best-effort class at a timing at which there is no data conforming to said first protocol from said weighting scheduler;

a protocol converter for converting the data conforming to said first protocol after said scheduling apparatus has shaped the transmission rate therefor to data conforming to said second protocol; and a multiplexer including a current data detector for supplying said scheduling apparatus with said rate information as indicative of a currently set reception rate for said user terminals, said multiplexer being configured to perform DSL processing using telephone lines to transmit to each of said user terminals the data conforming to said second protocol from said protocol converter or the data conforming to said first protocol after said scheduling apparatus has shaped the transmission rate therefor.

6. A network connection system for connecting a first communication network and a plurality of user terminals when a second communication network is interposed between said first communication network and said plurality of user terminals, said second communication network employing a second protocol different from a first protocol employed in said first communication network, said system comprising:

a scheduling apparatus including:
a classification processing unit for classifying data conforming to said first protocol received from said communication network based on quality guaranteed classes set thereto;
an overhead amount correction unit for correcting an overhead amount between a rate based on said second protocol and a rate based on said first protocol to convert received rate information on said second protocol to the rate based on said first protocol;
a preferential class upper limit setting unit, operative when the difference between the transmission rate for a preferential class among said classified classes determined to be using information fed back from said user terminals and said rate calculated by said overhead amount correction unit is lower than a minimally guaranteed rate for a minimum rate guaranteed class among the classes classified by said classification processing unit, for setting an upper limit to the transmission rate for said preferential class for shaping such that the minimally guaranteed rate can be assured for said minimum rate guaranteed class;
a weighting coefficient calculation unit, operative when said preferential class upper limit setting unit does not set the upper limit, for calculating a weighting coefficient based on said rate calculated by said overhead amount correction unit and the transmission rate for the preferential class such that the minimally guaranteed rate is assured for said minimum rate guaranteed class, said weighting coefficient calculation unit being further operative when said preferential class upper limit setting unit sets the upper limit, for calculating a weighting coefficient based on said rate calculated by said overhead amount correction unit and the upper limit rate set by said preferential class upper limit setting unit such that the minimally guaranteed rate is assured for said minimum rate guaranteed class;
a weighting scheduler for scheduling data conforming to said first protocol of said minimum rate guaranteed class and of a weighting applied class among said classified classes based on the weighting coefficient calculated by said weighting coefficient calculation unit to deliver the data in accordance with the scheduling; and
a preferential control scheduler for scheduling the data conforming to said first protocol of said preferential class, the data conforming to said first protocol from said weighting scheduler, and data conforming to said first protocol of a best-effort class among said classified classes such that the data conforming to said first protocol is delivered at a transmission rate equal to or lower than said rate calculated by said overhead amount correction unit, and for preferentially scheduling the data conforming to said first protocol of said preferential class, preferentially scheduling the data conforming to said first protocol from said weighting scheduler at a timing at which there is no data conforming to said first protocol of said preferential class, and delivering the data conforming to said first protocol of the best-effort class at a timing at which there is no data conforming to said first protocol from said weighting scheduler;

a protocol converter for converting the data conforming to said first protocol after said scheduling apparatus has shaped the transmission rate therefor to data conforming to said second protocol; and
a multiplexer including a current data detector for supplying said scheduling apparatus with said rate information as indicative of a currently set reception rate for said user terminals, said multiplexer being configured to perform DSL processing using telephone lines to transmit to each of said user terminals the data conforming to said second protocol from said protocol converter or the data conforming to said first protocol after said scheduling apparatus has shaped the transmission rate therefor.

7. A traffic shaping method, in a network connection system for connecting a communication network and a plurality of user terminals, for shaping a transmission rate for data conforming to a first protocol from said communication network, said method comprising the steps of:

classifying data conforming to said first protocol received from said communication network based on quality guaranteed classes set thereto;
correcting an overhead amount between a rate based on a second protocol and a rate based on said first protocol to convert received rate information on said second protocol to the rate based on said first protocol;
calculating a weighting coefficient such that a minimally guaranteed rate is assured for a minimum rate guaranteed class among said classified classes based on said calculated rate;
scheduling data conforming to said first protocol of said minimum rate guaranteed class and of a weighting applied class among said classified classes based on the calculated weighting coefficient to deliver the data in accordance with the scheduling; and
scheduling the data conforming to said first protocol after said weighting, and data conforming to said first protocol of a best-effort class among said classified classes, such that the data conforming to said first protocol is delivered at a transmission rate equal to or lower than said calculated rate, and for preferentially scheduling the data conforming to said first protocol after said weighting, so that the data conforming to said first protocol of said best effort class is delivered at a timing at which there is no data conforming to said first protocol after said weighting.

8. A traffic shaping method, in a network connection system for connecting a communication network and a plurality of user terminals, for shaping a transmission rate for data conforming to a first protocol from said communication network, said method comprising the steps of:

classifying data conforming to said first protocol received from said communication network based on quality guaranteed classes set thereto;
measuring a transmission rate for a preferential class among said classified classes;
correcting an overhead amount between a rate based on a second protocol and a rate based on said first protocol to convert received rate information on said second protocol to the rate based on said first protocol;
calculating a weighting coefficient based on said calculated rate and the transmission rate measured for the preferential class such that a minimally guaranteed rate is assured for a minimum rate guaranteed class among the classified classes;
scheduling data conforming to said first protocol of said minimum rate guaranteed class and of a weighting applied class among said classified classes based on the calculated weighting coefficient to deliver the data in accordance with the scheduling; and scheduling the data conforming to said first protocol of said preferential class, the data conforming to said first protocol after said weighting, and data conforming to said first protocol of a best-effort class among said classified classes such that the data conforming to said first protocol is delivered at a transmission rate equal to or lower than said calculated rate, and for preferentially scheduling the data conforming to said first protocol of said preferential class, preferentially scheduling the data conforming to said first protocol after said weighting at a timing at which there is no data conforming to said first protocol of said preferential class, and delivering the data conforming to said first protocol of the best-effort class at a timing at which there is no data conforming to said first protocol after said weighting.

9. A traffic shaping method, in a network connection system for connecting a communication network and a plurality of user terminals, for shaping a transmission rate for data conforming to a first protocol from said communication network, said method comprising the steps of:

classifying data conforming to said first protocol received from said communication network based on quality guaranteed classes set thereto;

measuring a transmission rate for a preferential class among said classified classes;

correcting an overhead amount between a rate based on said second protocol and a rate based on said first protocol to convert received rate information on said second protocol to the rate based on said first protocol;

when the difference between said measured transmission rate of the data conforming to said first protocol of the preferential class and said calculated rate is lower than a minimally guaranteed rate for a minimum rate guaranteed class among said classified classes, setting an upper limit to the transmission rate for said preferential class for shaping such that the minimally guaranteed rate can be assured for said minimum rate guaranteed class;

calculating a weighting coefficient based on said calculated rate and said transmission rate measured for the preferential class such that a minimally guaranteed rate is assured for said minimum rate guaranteed class, when the upper limit rate is not set for said preferential class, and calculating a weighting coefficient based on said calculated rate and said set upper limit rate such that the minimally guaranteed rate is assured for said minimum rate guaranteed class when the upper limit rate is set for said preferential class;

scheduling data conforming to said first protocol of said minimum rate guaranteed class and of a weighting applied class among said classified classes based on said calculated weighting coefficient to deliver the data in accordance with the scheduling; and scheduling the data conforming to said first protocol of said preferential class, the data conforming to said first protocol after said weighting, and data conforming to said first protocol of a best-effort class among said classified classes such that the data conforming to said first protocol is delivered at a transmission rate equal to or lower than said calculated rate, preferentially scheduling the data conforming to said first protocol of said preferential class, preferentially scheduling the data conforming to said first protocol after said weighting at a timing at which there is no data conforming to said first protocol of said preferential class, and delivering the data conforming to said first protocol of the best-effort class at a timing at which there is no data conforming to said first protocol after said weighting.

10. A traffic shaping method, in a network connection system for connecting a communication network and a plurality of user terminals, for shaping a transmission rate for data conforming to a first protocol from said communication network, said method comprising the steps of:

classifying data conforming to said first protocol received from said communication network based on quality guaranteed classes set thereto;

correcting an overhead amount between a rate based on a second protocol and a rate based on said first protocol to convert received rate information on said second protocol to the rate based on said first protocol;

calculating a weighting coefficient based on said calculated rate and the transmission rate for a preferential class among said classified classes determined to be using information fed back from said user terminals such that a minimally guaranteed rate is assured for a minimum rate guaranteed class among said classified classes;

scheduling data conforming to said first protocol of said minimum rate guaranteed class and of a weighting applied class among said classified classes based on said calculated weighting coefficient; and scheduling the data conforming to said first protocol of said preferential class, the data conforming to said first protocol after said weighting, and data conforming to said first protocol of a best-effort class among said classified classes such that the data conforming to said first protocol is delivered at a transmission rate equal to or lower than said calculated rate, preferentially scheduling the data conforming to said first protocol of said preferential class, preferentially scheduling the data conforming to said first protocol after said weighting at a timing at which there is no data conforming to said first protocol of said preferential class, and delivering the data conforming to said first protocol of the best-effort class at a timing at which there is no data conforming to said first protocol after said weighting.

11. A traffic shaping method, in a network connection system for connecting a communication network and a plurality of user terminals, for shaping a transmission rate for data conforming to a first protocol from said communication network, said method comprising the steps of:

classifying data conforming to said first protocol received from said communication network based on quality guaranteed classes set thereto;

correcting an overhead amount between a rate based on a second protocol and a rate based on said first protocol to convert received rate information on said second protocol to the rate based on said first protocol;

when the difference between the transmission rate for a preferential class among said classified classes determined using information fed back from said user terminals and said calculated rate is lower than a minimally guaranteed rate for a minimum rate guaranteed class among said classified classes, setting an upper limit to the transmission rate for said preferential class for shaping such that the minimally guaranteed rate can be assured for said minimum rate guaranteed class;

calculating a weighting coefficient based on said calculated rate and the transmission rate for the preferential class such that the minimally guaranteed rate is assured for said minimum rate guaranteed class, when the upper limit rate is not set for said preferential class, and calculating a weighting coefficient based on said calculated rate and said upper limit rate set for said preferential class such that the minimally guaranteed rate is assured for said minimum rate guaranteed class, when the upper limit rate is set for said preferential class;

scheduling data conforming to said first protocol of said minimum rate guaranteed class and of a weighting applied class among said classified classes based on said calculated weighting coefficient; and scheduling the data conforming to said first protocol of said preferential class, the data conforming to said first protocol after said weighting, and data conforming to said first protocol of a best-effort class among said classified classes such that the data conforming to said first protocol is transmitted at a transmission rate equal to or lower than said calculated rate, preferentially scheduling the data conforming to said first protocol of said preferential class, preferentially scheduling the data conforming to said first protocol after said weighting at a timing at which there is no data conforming to said first protocol of said preferential class, and delivering the data conforming to said first protocol of the best-effort class at a timing at which there is no data conforming to said first protocol after said weighting.

12. The traffic shaping method according to claim 7, wherein said first communication network is an IP network, said data conforming to said first protocol is an IP packet, said second network is an ATM network, and said data conforming to said second protocol is an ATM cell.

* * * * *